Sept. 29, 1942.    F. NALLINGER    2,297,237
AIRCRAFT ENGINE
Filed June 28, 1939

INVENTOR
Fritz Nallinger
BY
ATTORNEYS

Patented Sept. 29, 1942

2,297,237

UNITED STATES PATENT OFFICE 2,297,237

AIRCRAFT ENGINE

Fritz Nallinger, Stuttgart, Germany; vested in the Alien Property Custodian

Application June 28, 1939, Serial No. 281,597
In Germany April 23, 1938

10 Claims. (Cl. 123—119)

This invention relates to aircraft engines and is concerned with the operation of internal combustion engines with charging blowers, such as are used in aeroplanes.

It is an object of the invention to keep the fuel consumption as low as possible when long-distance flights at great altitudes are undertaken, and thereby to increase the radius of action of the aircraft. A further object of the invention is to spare the driving engine to a great extent in such long-distance flights without sacrifice of flying speed, in order as far as possible to obviate engine trouble during such flights.

In particular the invention has as its immediate aim to operate aircraft engines in long-distance flights at great flying altitudes, with as low a revolution speed as possible and with a relatively high mean pressure, since a low fuel consumption and a favourable efficiency of the airscrew are thereby attained.

Now the mean pressure with which the engine operates is essentially dependent upon the charging pressure which the charging blower produces. However, in the arrangements at present in use, the transmission ratio between the engine and the blower, even if variable for different flying altitudes, is always designed to suit the normal maximum revolution speed of the engine, that is, the engine must run at its normal maximum speed if the blower is to produce the full charging pressure, for example at the maximum flying altitude of the aircraft.

The invention, in contrast therewith, resides in this that the gearing arranged between the driving engine and the charging blower contains, in addition to the transmission range designed to suit the normal maximum revolution speed of the engine, an additional transmission step or an additional transmission range, the cutting-in of which causes the blower to be driven at a speed sufficient for producing the full charging pressure even if the engine is running, at high flying altitudes, at a revolution speed considerably reduced in relation to its normal maximum revolution speed.

Merely as an example for the illustration of what has been said above, but not by way of any restriction of the scope of the invention, let it be assumed that the normal maximum revolution speed of the engine is 2,500 revolutions per minute and the most favourable revolution speed for minimum fuel consumption in cruising flight is 1,600–1,800 revolutions per minute. The transmission ratio between the engine and charging blower is ordinarily so designed that the blower, at a certain flying altitude which is termed the "full-pressure altitude," only produces the full charging pressure if the engine is running at its normal maximum revolution speed of 2,500 revolutions per minute. Now, according to the invention, there is introduced into the transmission gearing a further higher transmission step which is selected so that the blower, at the same flying altitude as previously, produces the full charging pressure when the engine is running at 1,600–1,800 revolutions per minute only, that is at about only 65–75% of its normal maximum revolution speed. The effect of this additional transmission step is therefore similar to that of the so-called "over-drive" in the case of motor vehicles.

The arrangement may be made such that the additional transmission step is cut in and out by hand. However, in order to prevent positively the driving of the charging blower at an unallowably high revolution speed, if the revolution speed of the engine is increased beyond the prescribed value due to unforeseen extraneous circumstances, automatically operating control arrangements may be provided which temporarily cut out the additional transmission step for as long as the charging blower tends to exceed its allowable maximum revolution speed. Also, further automatically operating control devices may be provided which cut out the additional transmission step in dependence upon the external air pressure when the aircraft passes below the "full-pressure altitude," that is when the density of the air in lower air strata becomes of such value that the full charging pressure would be considerably exceeded if the additional transmission step were retained.

The nature of the transmission gearing employed between the driving engine and the charging blower is not of material significance. Thus use may be made both of change-speed wheel gearing and also of mechanical or hydraulic stepless or infinitely variable gearing. In the latter case, an additional transmission range is introduced instead of an additional transmission step. As the charging blower, use may be made of a rotary (Roots) blower, or of a centrifugal blower, or of a rotary piston blower. The details of the invention may be appreciated more clearly from the following description of two constructional examples, reference being made to the annexed drawing. In the drawing:

Figure 1:
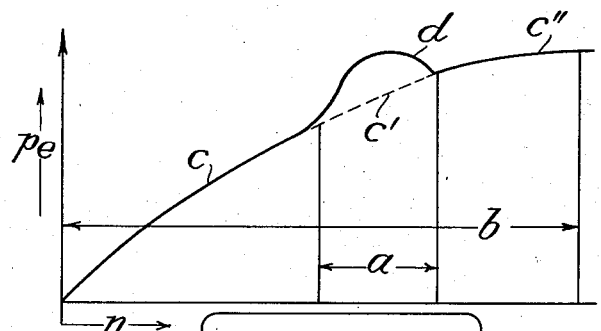
Figure 1 is a curve or characteristic obtained by plotting the mean pressure of an engine in relation to its revolution speeds.

In Figure 1, the mean pressures $p_e$ are plotted in relation to the revolution speed $n$. The curve $c$ represents the course of the pressure with normal charging over the whole range $b$ of revolution speed. If now, in accordance with the invention, the charging blower is driven through the step-up gearing over a range $a$ of revolution speed, which amounts for example to only 60–75% of the normal maximum revolution speed of the engine, then the mean pressure $p_e$ rises according to the curve $d$, whereas without the step-up gearing the curve would continue in accordance with the line $c'$. If the engine speed exceeds the range $a$, then the step-up gear for the charging blower is cut out either by hand or by automatic control, and the pressure thereafter follows the curve $c'$.

Figure 2:
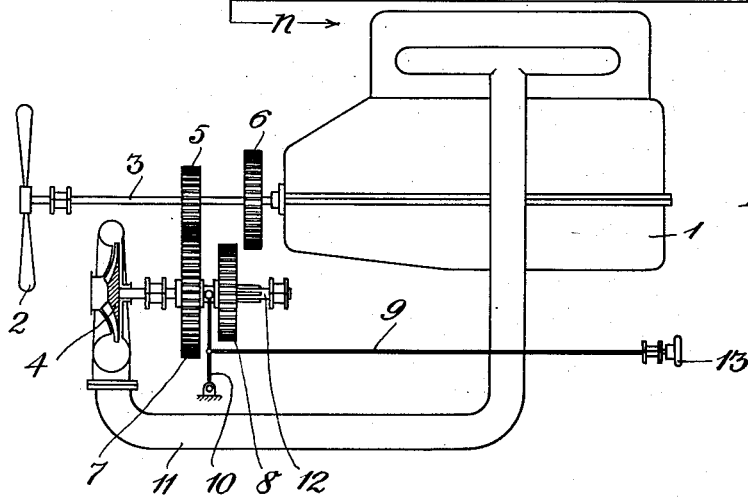
Figure 2 is a diagrammatic elevation of one constructional form of the invention with purely manual control.

In Figure 2, the engine is indicated by 1, the air-screw by 2 and the engine shaft by 3. The charging blower 4 is disposed upon the countershaft 12 upon which the two connected spur wheels 7 and 8 are mounted so as to be axially displaceable but non-rotatable. Fixedly connected to the engine shaft 3 are the spur wheels 5 and 6 which, depending upon the position of the pair of toothed wheels 7 and 8, mesh with the one or other of these wheels. Normally the charging blower 4 is driven through the spur wheels 5 and 7. If, however, an increase of the mean charging pressure is to be effected in the range $a$ of revolution speed, then the pair of toothed wheels, 6, 8 is moved into engagement through the linkage 9, 10 operated by the handle 13 and the speed of the charger 4 is thereby further stepped-up in relation to the engine speed. The air delivered by the charging blower 4 is supplied to the engine through the passage 11.

The linkage 9 may be acted upon by a suitable factor of operation instead of by hand. In place of a two-stage toothed-wheel gearing, use may also be made of a variable gearing with more than two steps or of a gearing which is controllable without steps. Also, within the scope of the invention, it is immaterial whether the propeller 2 is provided with fixed or adjustable blades.

Figure 3:
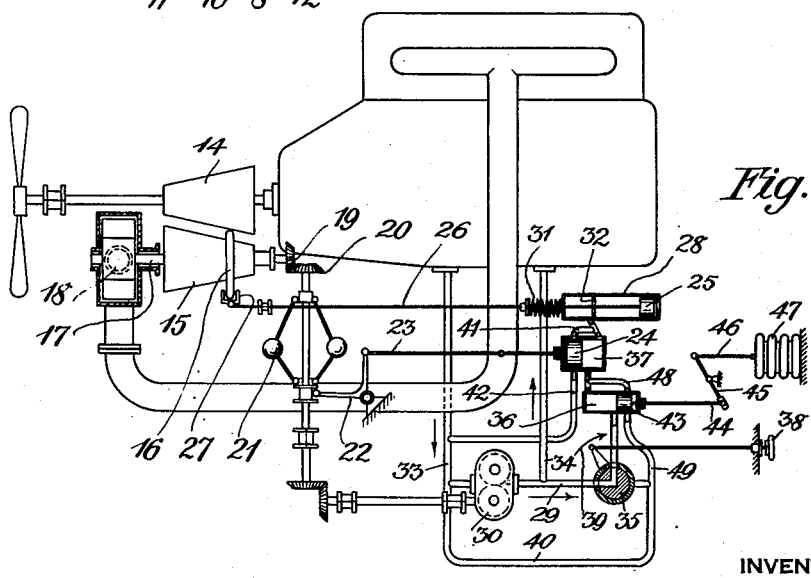
Figure 3 is a view similar to Figure 2 but of a second constructional form with automatically operating control means.

In Figure 3, a form of construction is illustrated with a rotary blower (Roots-blower), variable speed gearing (Stoeckicht system) controllable without steps, and automatic control for the changing of the transmission ratio for the blower drive. Mounted upon the engine shaft 3 is a truncated conical member 14 which, through the ring 16, drives the second truncated conical member 15 mounted upon the countershaft 17. The Roots-blower 18 is driven by the counter-shaft 17. The transmission ratio of the charger drive can be varied by displacing the ring 16. The ring 16 is displaced by the rod 26 by means of a fork 27. The rod 26 is connected to the operating piston 25 which slides in the cylinder 28 and is subject to the action of a compression spring 31 which tends always to move the piston leftwardly in Figure 3, that is to say, into the cylinder 28 and towards a stop 32. Thus the spring 31 tends to establish between the cones 14 and 15 a transmission ratio at which the charger 18 rotates at a relatively low revolution speed.

A gear-wheel pump 30 driven from the internal combustion engine draws in lubricating oil through the suction passage 33 from the lubricating-oil sump of the engine and forces it through the pressure passage 34 to the individual lubricating points of the engine. The pressure passage 34 is connected to the cylinder 28 by a branch passage 29 connected with a two-way cock 35 which, in turn, is connected with two small operating cylinders 36, 37 in series. Consequently, as long as this connection is not interrupted, the operating piston 25 is moved outwardly against the action of the spring 31 by the oil pressure produced by the pump 30, and the ring 16 is thereby displaced by the rod 26 into the position illustrated in the drawing, which position corresponds to the additional transmission range between the driving engine and charger, intended for long-distance flight at a high altitude.

To cut in this additional transmission range, the pilot must move the two-way cock 35 into the illustrated position by pressing on the knob 38. This opens the aforesaid path for the pressure oil from the branch passage 29 to the cylinder 28. If, after the termination of the cruising flight or for other reasons, the additional transmission range is to be cut out again, then the pilot pulls out the knob 38 and thereby turns the two-way cock 35 through 90° in the direction of the arrow 39. The cylinder 28 now communicates through the two-way cock 35 and the by-pass 40 with the suction side of the pump 30, so that the piston 25 is displaced inwardly under the action of the spring 31 and, through the rod 26, brings the ring 16 into a position which corresponds to a transmission ratio between the engine and the charger suited to the normal maximum revolution speed of the driving engine.

A centrifugal governor 21, which adjusts the small piston 24 in the cylinder 37 by way of the cranked lever 22 and the rod 23, is driven from the countershaft 17 by means of the two bevel wheels 19 and 20. If, after the additional transmission range has been cut in at the two-way cock 35 by the pilot, the speed of the engine rises in unforeseen fashion, so that the charging blower would be driven at an unallowably high speed, then the governor 21 displaces the piston 24 in the cylinder 37, so that the connection between the pressure passage of the pump 30 and the cylinder 28 is interrupted and at the same time ports are opened for the escape of oil from the cylinder 28 to the suction passage 33 of the pump by way of the passages 41, 42. Consequently, the rod 26, under the action of the spring 31, then cuts out the additional transmission range in the gearing 14–16 until the engine speed has again fallen to the cruising speed predetermined for the additional transmission range.

In a second small cylinder 36 slides a piston 43 which is controlled through a lever linkage 44–46 by an altitude capsule or barometric device 47 in such fashion that it closes the path for the oil from the pressure side of the pump 30 to the cylinder 28 when the aircraft passes below a certain flying altitude, so that the increasing external air pressure compresses the altitude capsule. At the same time ports are uncovered by the piston 43 for opening a path to the suction side of the pump 30 by way of the passages 48, 49, 40. Thus, pressure oil in the cylinder 28 is permitted to escape to the suction side so that the spring 31 is free to cut out again the additional transmission range in the gearing. By this means, the pressure in the blower or in the internal combustion engine is prevented from exceeding a certain allowable maximum value, if the pilot takes the aircraft substantially below the "full-pressure altitude" without himself cutting out the additional transmission range by pulling out the knob 38.

By the operating and control devices described, the result is thus achieved that the additional transmission ratio between the engine and the charger, intended for cruising flight at a reduced revolution speed of the internal combustion engine, can be employed only at an engine speed and at a flying altitude at which no harmful stresses occur in the engine or in the charger, whilst in all other cases the normal speed ratio between the engine and charger suited to the normal maximum speed of the engine remains positively engaged. Self evidently, the operating and control devices may be constructed, as to details, in ways differing from the examples illustrated and described, without departing from the limits of the present invention. Also, the operating and control devices illustrated in Figure 3 in conjunction with a step-less gearing may be equally well employed with a change-speed gearing such as is illustrated by way of example in Figure 2.

I claim:

1. In combination, an aircraft internal combustion engine, a charging blower therefor, a step-up variable speed gearing operative between said engine and said blower, a hand control operative for stepping up the transmission ratio of said gearing, and a speed-sensitive control operative for overriding said hand control and reducing the transmission ratio during excessive speed periods.

2. In combination, an aircraft internal combustion engine, a charging blower therefor, a variable speed gearing operative between said engine and said blower, a hand control operative for stepping up the ratio of transmission of said gearing, and a barometric control operative for over-riding said hand control when influenced by a predetermined external pressure.

3. In combination, an aircraft internal combustion engine, a charging blower therefor, a variable speed gearing operative between said engine and said blower, a servo-motor control operative for adjusting said gearing, a hand control for said servo-motor, and a speed-sensitive control operative for over-riding said hand control when the speed of said blower exceeds a predetermined maximum.

4. In combination, an aircraft internal combustion engine, a charging blower therefor, a variable speed gearing operative between said engine and said blower, a servo-motor control operative for adjusting said gearing, a hand control for said servo-motor, and a barometric control operative for over-riding said hand control whenever the atmospheric pressure exceeds a predetermined maximum.

5. In combination, an aircraft internal combustion engine, a charging blower therefor, a variable speed gearing operative between said engine and said blower, a servo-motor control operative for adjusting said gearing, a hand control for said servo-motor, a speed sensitive control operative for over-riding said hand control and reducing the transmission ratio whenever the speed of said blower exceeds a predetermined maximum, and a barometric control also operative for over-riding said hand control and for reducing the transmission ratio whenever the atmospheric pressure exceeds a predetermined maximum.

6. In combination with an internal combustion engine, a supercharger therefor, a variable speed transmission drivably connecting said supercharger to said engine, manual means for controlling said transmission, means responsive to the speed of said engine for disabling said hand control means, and means responsive to a predetermined atmospheric pressure for disabling said hand control means.

7. In combination with an internal combustion engine, a supercharger therefor, a variable speed transmission drivably connecting said supercharger to said engine, means for normally urging said transmission to a low speed ratio position, manual means for overriding said urging means and moving said transmission to a high speed ratio position, and means responsive to a predetermined excessive speed of the engine for disabling said manual means and permitting control of said transmission by said urging means.

8. In combination, an internal combustion engine, a supercharger therefor, a variable speed transmission drivably connecting said supercharger to said engine, means for moving said transmission between two extreme speed ratio positions including a spring for normally urging said transmission to one extreme position and a pressure responsive system for moving said transmission to the other extreme position, a source of fluid under pressure, a conduit for connecting said source of pressure fluid to said pressure responsive system, a manually operable valve in said conduit for controlling the flow of fluid to said pressure responsive system, and means responsive to a predetermined speed of said engine for disabling said pressure responsive system.

9. In combination with an internal combustion engine, a supercharger therefor, a variable speed transmission drivably connecting said supercharger to said engine, means for normally urging said transmission to a low speed ratio, manual means for overriding said urging means and moving said transmission to a high speed ratio position, and means responsive to a predetermined barometric pressure for disabling said manual means and permitting control of said transmission by said urging means.

10. In combination, an internal combustion engine, a supercharger therefor, a variable speed transmission drivably connecting said supercharger to said engine, means for moving said transmission between two extreme speed ratio positions, including a spring for normally urging said transmission to one extreme position and a pressure-responsive system for moving said transmission to the other extreme position, a source of fluid under pressure, a conduit for connecting said source of pressure fluid to said pressure-responsive system, a manually operable valve in said conduit for controlling the flow of fluid to said pressure-responsive system, and means responsive to a predetermined atmospheric pressure for disabling said pressure-responsive system.

FRITZ NALLINGER.